United States Patent
Liu et al.

(10) Patent No.: US 11,347,348 B2
(45) Date of Patent: May 31, 2022

(54) TOUCH PANEL AND DRIVING METHOD THEREOF, AND TOUCH DEVICE

(71) Applicant: BOE TECHNOLOGY GROUP CO., LTD., Beijing (CN)

(72) Inventors: Yingming Liu, Beijing (CN); Haisheng Wang, Beijing (CN); Xiaoliang Ding, Beijing (CN); Xue Dong, Beijing (CN); Rui Xu, Beijing (CN); Changfeng Li, Beijing (CN); Liguang Deng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 601 days.

(21) Appl. No.: 16/334,221

(22) PCT Filed: Aug. 16, 2018

(86) PCT No.: PCT/CN2018/100837
§ 371 (c)(1),
(2) Date: Mar. 18, 2019

(87) PCT Pub. No.: WO2019/052304
PCT Pub. Date: Mar. 21, 2019

(65) Prior Publication Data
US 2021/0373734 A1 Dec. 2, 2021

(30) Foreign Application Priority Data
Sep. 12, 2017 (CN) .......................... 201710817685.2

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/0412* (2013.01); *G06F 2203/04105* (2013.01)

(58) Field of Classification Search
CPC .......... G06F 2203/04105; G06F 3/0412; G06F 3/04166; G06F 2203/04107; G06F 3/044
See application file for complete search history.

(56) References Cited

U.S. PATENT DOCUMENTS 10,133,383 B2    11/2018    Wang et al.
2010/0013785 A1   1/2010    Murai et al.
(Continued)

FOREIGN PATENT DOCUMENTS

CN    106249953 A    12/2016
CN    106708303 A     5/2017
(Continued)

OTHER PUBLICATIONS

Extended European Search Report in European Patent Application No. 18855145.1 dated May 19, 2021.
(Continued)

*Primary Examiner* — Hong Zhou
(74) *Attorney, Agent, or Firm* — Collard & Roe, P.C.

(57) ABSTRACT

A touch panel and a driving method thereof, and a touch device are provided. The touch panel includes a first base substrate, a second base substrate, a first electrode, a piezoelectric layer and a second electrode. The second base substrate is opposite to the first base substrate. The first electrode is on a side of the first base substrate facing away from the second base substrate, and is configured to provide a reference. The piezoelectric layer is between the first electrode and the first base substrate. The second electrode is between the first base substrate and the second base substrate. The piezoelectric layer is configured to generate
(Continued)

first charges on a side thereof close to the second electrode upon being pressed, and the second electrode is configured to couple the first charges at a pressed position and output a touch signal.

17 Claims, 5 Drawing Sheets

(56) References Cited

U.S. PATENT DOCUMENTS

| | | | |
|---|---|---|---|
| 2016/0179276 A1 | 6/2016 | Nathan et al. | |
| 2016/0195994 A1* | 7/2016 | Kitada | G06F 3/0446 345/174 |
| 2017/0010738 A1* | 1/2017 | Kurasawa | G06F 3/0412 |
| 2017/0147122 A1* | 5/2017 | Gu | G06F 3/0412 |
| 2017/0190922 A1* | 7/2017 | Ko | C09D 7/63 |
| 2017/0199624 A1 | 7/2017 | Nathan et al. | |
| 2017/0228072 A1* | 8/2017 | Amin | H01L 41/081 |
| 2017/0249050 A1* | 8/2017 | Xi | G06F 3/04164 |
| 2017/0262099 A1* | 9/2017 | Nathan | G06F 3/0446 |
| 2017/0338287 A1* | 11/2017 | Ito | G06F 3/0443 |

FOREIGN PATENT DOCUMENTS

| | | |
|---|---|---|
| CN | 106933424 A | 7/2017 |
| WO | 2017/078448 A1 | 5/2017 |

OTHER PUBLICATIONS

International Search Report of PCT/CN2018/100837 in Chinese, dated Nov. 15, 2018, with English translation.
Notice of Transmittal of the International Search Report of PCT/CN2018/100837 in Chinese, dated Nov. 15, 2018.
Written Opinion of the International Searching Authority of PCT/CN2018/100837 in Chinese, dated Nov. 15, 2018 with English translation.

* cited by examiner

TOUCH PANEL AND DRIVING METHOD THEREOF, AND TOUCH DEVICE

CROSS-REFERENCE TO RELATED APPLICATIONS

This application is the National Stage of PCT/CN2018/100837 filed on Aug. 16, 2018, which claims priority under 35 U.S.C. § 119 of Chinese Application No. 201710817685.2 filed on Sep. 12, 2017, the disclosure of which is incorporated by reference.

TECHNICAL FIELD

At least one embodiment of the present disclosure relates to a touch panel and a driving method thereof, and a touch device.

BACKGROUND

At present, 3D touch including force touch, which is brought about by IPhone, and its application are more and more popular; by detecting a pressure, more touch functions are implemented, and meanwhile, by judging how much the pressure is, pressure feedbacks of different levels are output, which bring consumers better touch experience. It can be predicted that 3D touch will be more and more applied to consumer electronics.

SUMMARY

At least one embodiment of the disclosure relates to a touch panel and a driving method thereof, and a touch device.

At least one embodiment of the disclosure provides the touch panel. The touch panel comprises a first base substrate, a second base substrate, a first electrode, a piezoelectric layer and a second electrode. The second base substrate is opposite to the first base substrate. The first electrode on a side of the first base substrate facing away from the second base substrate, and configured to provide a reference. The piezoelectric layer between the first electrode and the first base substrate. The second electrode between the first base substrate and the second base substrate. The piezoelectric layer is configured to generate first charges on a side thereof close to the second electrode upon being pressed, and the second electrode is configured to couple the first charges at a pressed position and output a touch signal.

In the touch panel provided by at least one embodiment of the disclosure, a material of the first electrode is a high-resistance material with a square resistance greater than 1M $\Omega/\square$.

In the touch panel provided by at least one embodiment of the disclosure, the first electrode is connected with a reference voltage terminal.

In the touch panel provided by at least one embodiment of the disclosure, the first electrode is further configured to output at least one of static electricity and second charges, and the second charges are charges generated by the piezoelectric layer upon being pressed and having a polarity opposite to the first charges.

In the touch panel provided by at least one embodiment of the disclosure, the piezoelectric layer is in contact with the first electrode.

The touch panel provided by at least one embodiment of the disclosure further comprises a conductive grid electrode, in which, the conductive grid electrode is between the first electrode and the piezoelectric layer.

In the touch panel provided by at least one embodiment of the disclosure, the second electrode includes a plurality of second sub-electrodes insulated from one another, and an orthogonal projection of the conductive grid electrode on the first base substrate does not coincide with orthogonal projections of the plurality of second sub-electrodes on the first base substrate.

In the touch panel provided by at least one embodiment of the disclosure, an orthogonal projection of a grid line of the conductive grid electrode on the first base substrate is between the orthogonal projections of adjacent second sub-electrodes on the first base substrate.

In the touch panel provided by at least one embodiment of the disclosure, the second electrode is on a side of the first base substrate facing away from the piezoelectric layer.

In the touch panel provided by at least one embodiment of the disclosure, the second electrode is on a side of the second base substrate close to the first base substrate.

In the touch panel provided by at least one embodiment of the disclosure, the second electrode is further used as a display electrode.

In the touch panel provided by at least one embodiment of the disclosure, a shape of the first electrode includes a planar shape or a grid shape, and a shape of the piezoelectric layer includes a planar shape or a grid shape.

The touch panel provided by at least one embodiment of the disclosure further comprises a detector unit, in which, the detector unit is configured to detect the touch signal so as to obtain a touch pressure.

At least one embodiment of the disclosure provides the driving method of the touch panel as described above. The driving method comprises: inputting a reference signal to the first electrode; inputting a touch drive signal to the second electrode, the piezoelectric layer generating the first charges on the side thereof close to the second electrode upon being pressed, the second electrode coupling the first charges at the pressed position and outputting the touch signal; and detecting the touch signal to recognize a touch position and a touch pressure.

In the driving method provided by at least one embodiment of the disclosure, the detecting the touch signal to recognize the touch position and the touch pressure includes: decomposing a touch position signal and a touch superposed signal from the touch signal, to obtain the touch position from the touch position signal and obtain the touch pressure from the touch superposed signal.

In the driving method provided by at least one embodiment of the disclosure, touch and display are performed in a time-division manner, and the driving method comprises: inputting a display signal to the second electrode in a first time period; inputting the touch drive signal to the second electrode in a second time period.

At least one embodiment of the disclosure further provides the touch device, and the display device comprises the touch panel as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the descriptions and claims of the present disclosure, expressions such as "first", "second" and the like do not denote any order, quantity, or importance, but rather are used for distinguishing different components. Similarly, expressions such as "include" or "comprise" and the like denote that elements or objects appearing before the words of "include" or "comprise" cover the elements or the objects enumerated after the words of "include" or "comprise" or equivalents thereof, not exclusive of other elements or objects. Expressions such as "connect" or "interconnect" and the like are not limited to physical or mechanical connections, but may include electrical connections, whether direct or indirect. Expressions such as "up", "down", "left", "right" and the like are only used for expressing relative positional relationship, the relative positional relationship may be correspondingly changed in the case that the absolute position of a described object is changed.

Figure 1:
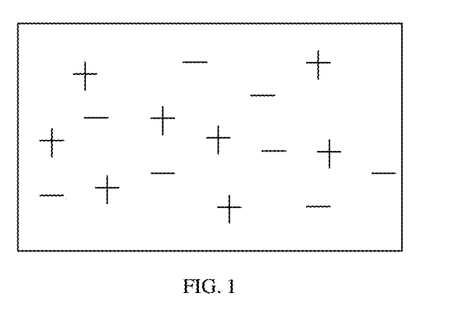
FIG. 1 is a state diagram of a piezoelectric material in a case where it is not subjected to an external force.

FIG. 1 is a state diagram of a piezoelectric material in a case where it is not subjected to an external force. As shown in FIG. 1, in the case where the piezoelectric material is not subjected to the external force, charges are randomly distributed within the piezoelectric material, and surfaces of the piezoelectric material are not charged.

Figure 2:
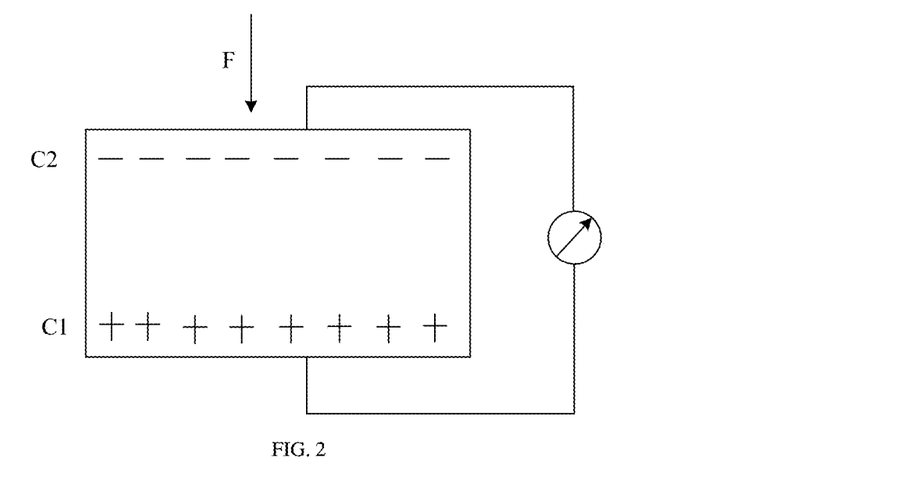
FIG. 2 is a state diagram of the piezoelectric material in a case where it is subjected to the external force to generate a piezoelectric effect.

FIG. 2 is a state diagram of the piezoelectric material in a case where it is subjected to the external force to generate a piezoelectric effect. As shown in FIG. 2, in the case where the piezoelectric material is subjected to the external force, deformation occurs so that the surfaces of the piezoelectric material are charged; one surface of the piezoelectric material has first charges C1, the other surface of the piezoelectric material opposite to the one surface has second charges C2, and the first charges and the second charges are opposite with each other in polarity. Description will be provided with a case where the first charges C1 are positive charges, and the second charges are negative charges as an example, which, however, is not limited thereto.

The piezoelectric material is used in the embodiments of the present disclosure, to facilitate implementation of sensitive pressure touch detection.

Figure 3A:
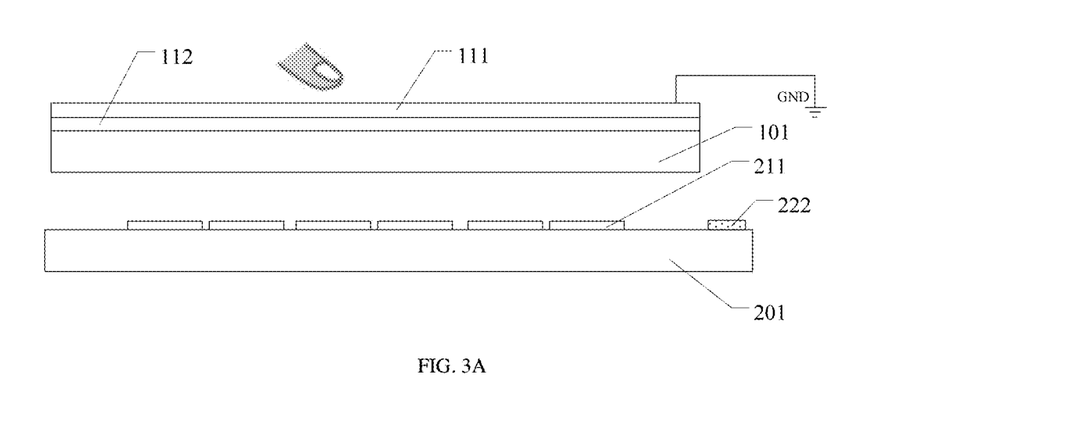
FIG. 3A is a cross-sectional view of a touch panel provided by at least one embodiment of the present disclosure.

FIG. 3A is a cross-sectional view of a touch panel provided by the embodiments of the present disclosure. As shown in FIG. 3A, at least one embodiment of the present disclosure provides the touch panel, and the touch panel comprises: a first base substrate 101, a second base substrate 201, a first electrode 111, a piezoelectric layer 112, and a second electrode 211. The second base substrate 201 and the first base substrate 101 are opposite to each other. The first electrode 111 is on a side of the first base substrate 101 facing away from the second base substrate 201, and is configured to provide a reference. The piezoelectric layer 112 is located between the first electrode 111 and the first base substrate 101, for example, the piezoelectric layer 112 is on the side of the first base substrate 101 facing away from the second base substrate 201. The second electrode 211 is between the first base substrate 101 and the second base substrate 201. For example, the second electrode 211 is on the first base substrate 101 or the second base substrate 201; for example, the second electrode 211 is on a side of the second base substrate 201 close to the first base substrate 101, or the second electrode 211 is on a side of the first base substrate 101 close to the second base substrate 201.

For example, as shown in FIG. 3A, the piezoelectric layer 112 is between the first electrode 111 and the second electrode 211, and the second electrode 211 and the piezoelectric layer 112 overlap with each other in a direction perpendicular to the first base substrate 101. For example, an orthogonal projection of the second electrode 211 on the first base substrate 101 falls within an orthogonal projection of the piezoelectric layer 112 on the first base substrate 101. The piezoelectric layer 112 is configured to generate first charges on a side thereof close to the second electrode 211 upon being pressed, and the second electrode 211 is configured to couple the first charges at a pressed position and output a touch signal for recognizing a touch position and a touch pressure.

For example, the second electrode 211 is a self-capacitive electrode. As shown in FIG. 3A, the second electrode 211 includes a plurality of second sub-electrodes 2111 insulated from one another. The touch position for example is recognized through the output signal of the second electrode 211 (the plurality of second sub-electrodes 2111). For example, the second electrode 211 is made of a transparent conductive metal oxide. The transparent conductive metal oxide includes, for example, indium tin oxide (ITO), but is not limited thereto. Because the second electrode 211 couples the first charges, the output signal (the touch signal) at the touch position becomes more comprehensive, and thus, the touch pressure is recognized.

For example, in the embodiments of the present disclosure, a principle of implementing touch is that: due to an electric field of a human body, a finger acts as a conductor and forms an external capacitance (Ce) with the second electrode 211 (the plurality of second sub-electrodes 2111) if the finger touches a light emergent side of the touch panel (for example, in FIG. 3A, the side of the first base substrate facing away from the second base substrate is the light emergent side); the external capacitance (Ce) and a self-inductive capacitance (Cp) of the second electrode 211 (the plurality of second sub-electrodes 2111) form a coupled electric field between the second electrode 211 (the plurality of second sub-electrodes 2111) and the finger, which will change a magnitude of the self-inductive capacitance (Cp). According to the change of the self-inductive capacitance (Cp), a position of the touch point is determined, so as to implement the touch position recognition function.

A principle of implementing pressure detection is that: the piezoelectric layer 112 generates the first charges on the side thereof close to the second electrode 211 under the action of the external force (such as the press), and the first charges form a coupled electric field between the second electrode 211 (the plurality of second sub-electrodes 2111) and the finger, which will change the magnitude of the self-inductive capacitance (Cp). According to the change of the self-inductive capacitance at the position of the touch point, the touch pressure of the touch point is calculated, so as to implement the touch pressure detection function. For example, the second electrode 211 (the second sub-electrode 2111) at the pressed position couples the first charges. For example, if the pressure is larger, the amount of the first charges generated is larger, and thus, influence of the generated first charges on the self-inductive capacitance (Cp) is greater, and the self-inductive capacitance (Cp) changes more greatly. That is, the magnitude of the touch pressure is obtained according to a degree of the change of the self-inductive capacitance (Cp).

For example, the touch signal varies with different amounts of the first charges being coupled by the second electrode 211. For example, the touch signal increases as the amount of the first charges being coupled increases. The touch signal includes the pressure signal formed by the second electrode 211 coupling the first charges. If the first charges are coupled, the output signal at the touch position includes the pressure signal (which is a superposed signal). If there is no pressure, the output signal at the touch position is an electrical signal generated by a capacitance obtained by superposing the self-inductive capacitance (Cp) of the second electrode 211 (the second sub-electrode 2111) at the touch position and the external capacitance (Ce), and the touch position is obtained according to the electrical signal.

In order to implement the touch pressure detection function with a most simplified structure, it is necessary to take a lot of factors into account in a case where the piezoelectric material is integrated between the first base substrate 101 and the second base substrate 201, for example, a fine patterning of the piezoelectric material, an influence of the piezoelectric material on display, and so on. In order to implement both of the touch position recognition function and the touch pressure detection function in a most simpli-fied and compatible manner, the piezoelectric layer 112 for example is provided outside a space between the first base substrate 101 and the second base substrate 201, so as to avoids an influence on display.

The touch panel provided by at least one embodiment of the present disclosure has the pressure detection function. Since the piezoelectric layer is provided, the piezoelectric material has its property play a role in the case where the piezoelectric material is subjected to the external force, for example, a force that the finger presses the piezoelectric material; the charges generated by the piezoelectric material are coupled onto the second electrode 211; and under an action of the first electrode 111 as a reference electrode, the touch signal is read out, and the pressure signal is further obtained. The touch signal includes, for example, a voltage and/or current signal.

The touch panel provided by at least one embodiment of the present disclosure has a simple structure, a low cost, and obvious advantages, and not only implements the pressure touch detection, but also implements the sensitive pressure touch detection.

For example, the first base substrate 101 and the second base substrate 201 are glass substrates, but it is not limited thereto, they may be substrates of other insulating materials. For example, the first electrode 111 and the piezoelectric layer 112 are on the side of the first base substrate 101 facing away from the second base substrate 201. For example, the piezoelectric layer 112 is in contact with the first base substrate 101, but it is not limited thereto. For example, at least the first base substrate 101 is between the second electrode 211 and the piezoelectric layer 112.

For example, the piezoelectric layer 112 is made of a piezoelectric material, and the piezoelectric layer 112 has the piezoelectric effect. The piezoelectric effect refers to that deformation occurs in a case where a medium is subjected to the external force, and further results in that surfaces of the medium are charged. This is a positive piezoelectric effect.

For example, a material of the piezoelectric layer 112 includes at least one of an organic piezoelectric material and an inorganic piezoelectric material. For example, the organic piezoelectric material includes, but is not limited to, polyvinylidene chloride (PVDC), polyvinylidene fluoride (PVDF), and the like; for example, the inorganic piezoelectric material includes, but is not limited to, aluminum nitride. The piezoelectric layer may be made of other materials.

Touch for example is divided into two cases: with pressure and without pressure. In a case of the touch without pressure, the piezoelectric material is used as an insulating material. At this time, the touch position is obtained through the touch signal output by the second electrode 211 (the second electrode 211 does not couple the first charges, and thus the touch signal does not include the pressure signal). For example, in a case of the touch with pressure, the touch position and the touch pressure are obtained through the touch signal superposed with the pressure signal and output by the second electrode 211 (the second electrode 211 couples the first charges, and the touch signal includes the pressure signal).

Because the signal output by the second electrode 211 varies from the case of the charges being coupled to the case of no charges being coupled, it is distinguished whether there is the touch pressure or not. The magnitude of the touch pressure is distinguished according to the amount of the charges being coupled. For example, the touch position and the touch pressure are determined by using an algorithm according to the touch signal output by the second electrode 211.

As shown in FIG. 3A, the touch panel further comprises a detector unit 222; the detector unit 222 is provided on the second base substrate 201, and the detector unit 222 is configured to detect the touch signal output by the second electrode 211 so as to detect the touch pressure. The detector unit 222 includes, for example, a detection circuit (a detection IC). For example, the plurality of second sub-electrodes 2111 are respectively electrically connected with the detector unit 222.

As shown in FIG. 3A, according to the touch panel provided by the embodiments of the present disclosure, the piezoelectric layer 112 is electrically connected with the first electrode 111, but it is not limited thereto. For example, the piezoelectric layer 112 and the first electrode 111 are insulated from each other. For example, the piezoelectric layer 112 is in contact with the first electrode 111; thus, it is conducive to coupling the first charges generated by the piezoelectric layer 112 on the surface, which is on the side close to the first base substrate 101, of the piezoelectric layer 112 onto the second electrode 211/the second sub-electrode 2111.

According to the touch panel provided by the embodiments of the present disclosure, the first electrode 111 is further configured to output at least one of static electricity and second charges, and the second charges are charges generated by the piezoelectric layer 112 upon being pressed and having a polarity opposite to the first charges.

As shown in FIG. 3A, according to the touch panel provided by the embodiments of the present disclosure, there is an isolator between the second electrode 211 and the piezoelectric layer 112, and the isolator at least incudes the first base substrate 101. As shown in FIG. 3A, the second electrode 211 is on the side of the second base substrate 201 close to the first base substrate 101. As shown in FIG. 3A, the second electrode 211 is on the second base substrate 201. For example, the second electrode 211 is an electrode which is further used in a display panel. For example, a common electrode in the display panel is further used as the second electrode 211, but it is not limited thereto. For example, the common electrode is an electrode in a liquid crystal display panel that generates an electric field with a pixel electrode to drive a liquid crystal to rotate; for example, the second base substrate 201 is an array substrate, and the first base substrate 101 is an opposed substrate, for example, a color filter substrate, but it is not limited thereto. For example, the common electrode is a cathode for display in an organic light emitting diode (OLED) display panel. In a case where the touch panel is the organic light emitting diode display panel, the first base substrate 101 for example is a package substrate, the second base substrate 201 for example is the array substrate; and the array substrate for example includes a thin film transistor, an anode electrically connected with a drain electrode of the thin film transistor, the cathode, and an organic material functional layer located between the anode and the cathode.

As shown in FIG. 3A, according to the touch panel provided by the embodiments of the present disclosure, the first electrode 111 is connected with a reference voltage terminal, the reference voltage terminal is, for example, a ground terminal, and it is described with the grounding terminal as an example in the embodiments of the present disclosure. For example, the first electrode 111 is connected with the reference voltage terminal through a silver paste. The grounding of the first electrode 111 prevents influence of external static electricity on the touch panel, and the external static electricity is introduced into the ground by the first electrode 111, so as to protect a display screen from being influenced by the external static electricity. For example, the reference voltage terminal is located on the second base substrate 201. The first electrode 111 is made of a high-resistance material, and a resistance of the high-resistance material is around an order of million ohms, and thus the touch signal is not affected by shielding.

As shown in FIG. 3A, according to the touch panel provided by the embodiments of the present disclosure, the first electrode 111 is made of the high-resistance material, and a material having a square resistance greater than 1M Ω/□ (Ω/sq) is served as the high-resistance material. For example, the square resistance is a resistance value per unit area of a unit thickness of a conductive material. For example, the square resistance refers to a ratio of resistivity to a thickness of the material. Since the resistance of the high-resistance material is relatively high, the touch signal is not affected by shielding, and meanwhile, the external static electricity is introduced by the high-resistance material into the reference voltage terminal such as the grounding terminal, so as to protect the touch panel from being influenced by the external static electricity. For example, with respect to the material of the first electrode 111, a conductive material (a conductive host) is doped with insulating particles, to form a conductive material doped with the insulating particles, which is conducive to obtaining the desired resistance. The conductive host includes, for example, polyethylene dioxythiophene (PEDOT) and a transparent conductive metal oxide. The transparent conductive metal oxide includes, but is not limited to, for example, indium tin oxide (ITO). The insulating particles includes, for example, at least one of silicon oxide and silicon oxynitride. For example, the material of the first electrode 111 includes, but is not limited to, polyethylene dioxythiophene (PEDOT) doped with insulating particles of silicon oxide. The high-resistance material has the high resistance, but it is also conductive, which is conducive to providing a reference potential and/or outputting the charges. For example, the first electrode 111 is made of the transparent material, which is conducive to the improvement of transmittance. For example, the first electrode 111 is made of the transparent conductive high-resistance material.

Figure 3B:
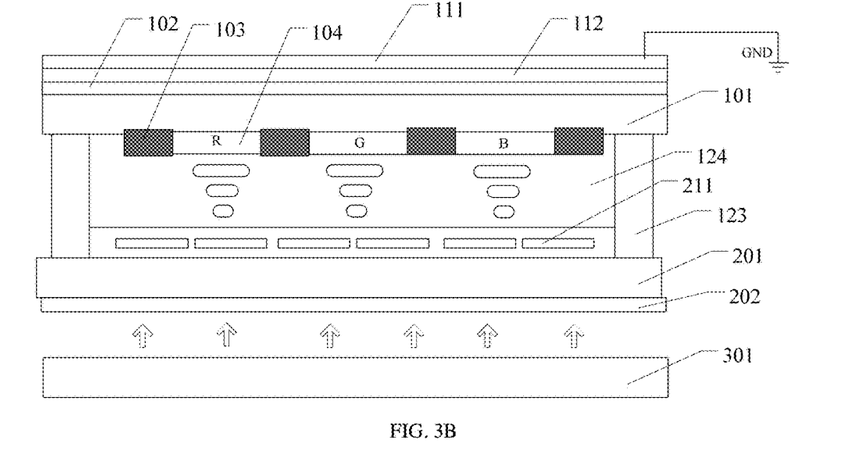
FIG. 3B is a cross-sectional view of the touch panel provided by at least one embodiment of the present disclosure.

FIG. 3B is a cross-sectional view of the touch panel provided by the embodiments of the present disclosure. As shown in FIG. 3B, the first base substrate 101 and the second base substrate 201 are provided opposite to each other to form a cell. The first base substrate 101 and the second base substrate 201 for example are bonded together by a sealant 123. A liquid crystal layer 124 is provided inside the cell. The embodiments of the present disclosure is described with the touch liquid crystal display panel as an example, but it is not limited thereto. Other display panels, for example, the organic light emitting diode display panel and the like may be adopted.

For example, FIG. 3B further shows a first polarizer 102 and a second polarizer 202. For example, the piezoelectric layer 112 is provided on a side of the first polarizer 102 facing away from the first base substrate 101, but it is not limited thereto. For example, the piezoelectric layer 112 is provided between the first base substrate 101 and the first polarizer 102.

As shown in FIG. 3B, the touch panel/the touch display panel provided by the embodiments of the present disclosure further comprises a black matrix 103 and a color filter layer 104 in order to implement color display. FIG. 3B further shows a backlight source 301 for providing backlight.

Figure 3C:
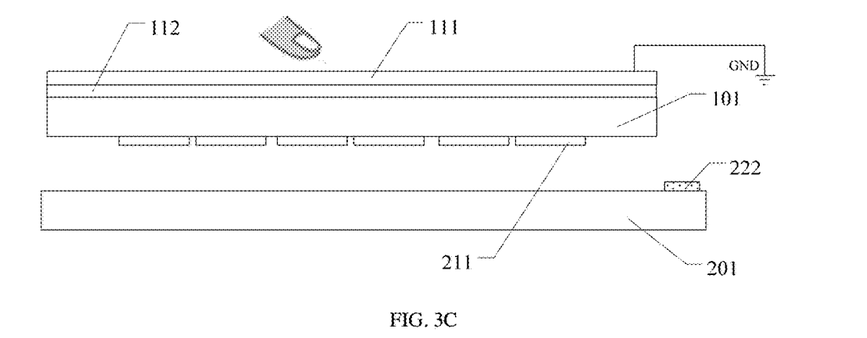
FIG. 3C is a cross-sectional view of the touch panel provided by at least one embodiment of the present disclosure.

FIG. 3C is a cross-sectional view of the touch panel provided by the embodiments of the present disclosure. As shown in FIG. 3C, the second electrode 211 is on a side of the first base substrate 101 facing away from the piezoelectric layer 112. The piezoelectric layer 112 and the second electrode 211 are located on opposite sides of the first base substrate 101.

Figure 4:
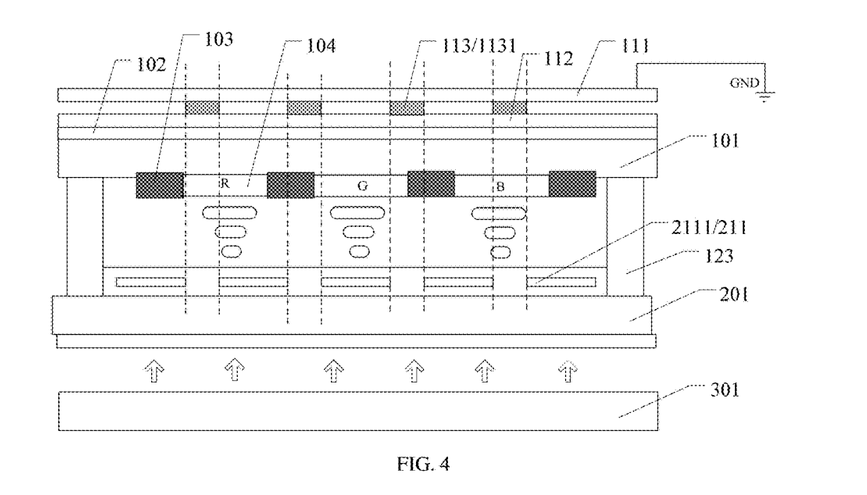
FIG. 4 is a cross-sectional view of the touch panel provided by at least one embodiment of the present disclosure.

FIG. 4 is a cross-sectional view of the touch panel provided by the embodiments of the present disclosure. As shown in FIG. 4, according to the touch panel provided by the embodiments of the present disclosure, in order to make the first electrode 111 better play the role as the reference electrode (with constant potential) and obtain a uniform and stable signal, the touch panel further comprises a conductive grid electrode 113, and the conductive grid electrode 113 is provided between the first electrode 111 and the piezoelectric layer 112. For example, a material of the conductive grid electrode 113 includes a transparent conductive material, for example, grapheme, nanometer silver and the like.

As shown in FIG. 4, according to the touch panel provided by the embodiments of the present disclosure, in order not to affect the touch function, the conductive grid electrode 113 and the plurality of second sub-electrodes 2111 do not overlap with each other in the direction perpendicular to the first base substrate 101. For example, an orthogonal projection of the conductive grid electrode 113 on the first base substrate 101 does not coincide with orthogonal projections of the plurality of second sub-electrodes 2111 on the first base substrate 101. For example, "not coincide" refers to "have no overlapping area". For example, the second sub-electrodes 2111 are separately lead out to facilitate the output of the signal, but it is not limited thereto.

As shown in FIG. 4, according to the touch panel provided by the embodiments of the present disclosure, a grid line 1131 of the conductive grid electrode 113 is between adjacent second sub-electrodes 2111. For example, the grid line 1131 of the conductive grid electrode 113 is located at a gap of the second sub-electrodes 2111. For example, the conductive grid electrode 113 is electrically connected with the first electrode 111. For example, the conductive grid electrode 113 is in contact with the first electrode 111. For example, the conductive grid electrode 113 is in contact with the piezoelectric layer 112, which prevents the external static electricity on an entire surface without affecting the touch effect and implements better pressure touch detection.

Figure 5:
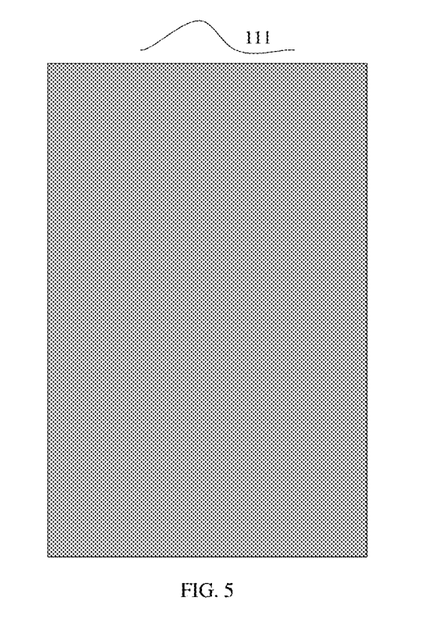
FIG. 5 is a plan view of a first electrode in the touch panel provided by at least one embodiment of the present disclosure.

FIG. 5 is a plan view of the first electrode in the touch panel provided by the embodiments of the present disclosure. FIG. 5 shows the first electrode 111 in a planar shape, but in the embodiments of the present disclosure, a shape of the first electrode 111 is not limited thereto, and may be other shape such as a grid shape. The shape of the conductive grid electrode 113 may be referred to for the grid-shaped first electrode 111, but it is not limited thereto.

It should be noted that, in the embodiments of the present disclosure, the first electrode 111 for example includes a plurality of first sub-electrodes insulated from one another. For example, the plurality of first sub-electrodes are insulated from and intersected with the plurality of second sub-electrodes, which also achieves the detection of the touch position and/or the touch pressure.

Figure 6:
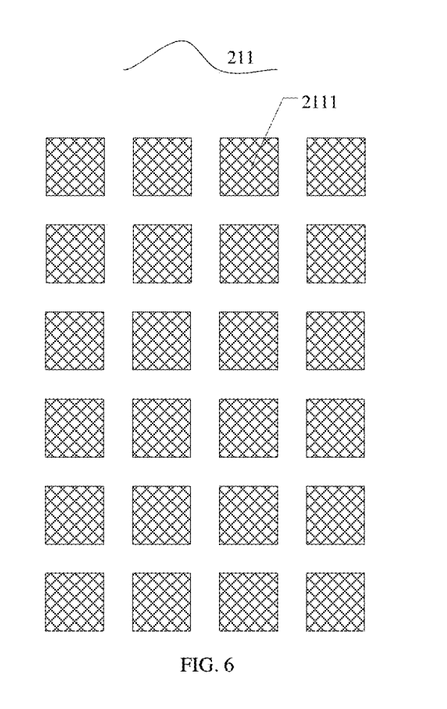
FIG. 6 is a plan view of a second electrode in the touch panel provided by at least one embodiment of the present disclosure.

FIG. 6 is a plan view of the second electrode in the touch panel provided by the embodiments of the present disclosure. FIG. 6 shows a pattern of the second electrode 211, including the plurality of second sub-electrodes 2111 insulated from one another. The plurality of second sub-electrodes 2111 for example are arranged in an array.

Figure 7:
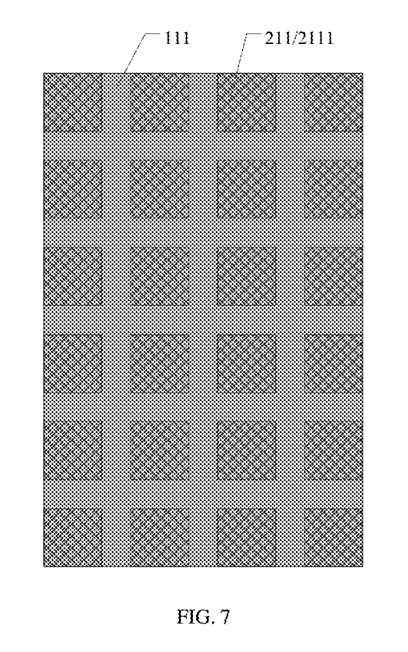
FIG. 7 is a plan view of the first electrode and the second electrode in the touch panel provided by at least one embodiment of the present disclosure.

FIG. 7 shows a schematic plan view of the first electrode 111 and the second electrode 211. For example, in the plan view, the first electrode 111 and the second electrode 211 overlap with each other at a pattern of the second electrode 211. For example, in the plan view, the first electrode 111 and the second electrode 211 overlap with each other at patterns of the second sub-electrodes 2111.

Figure 8:
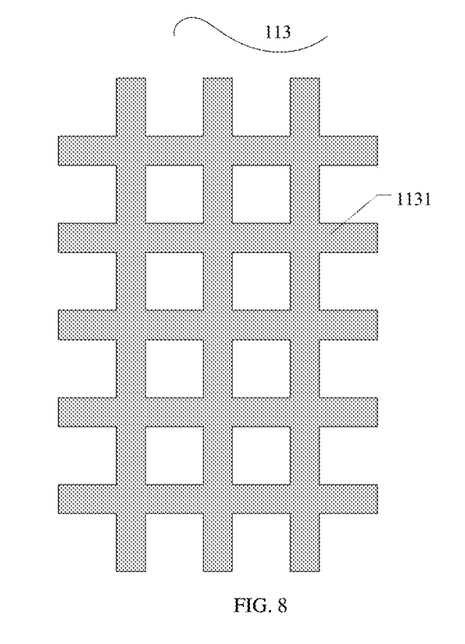
FIG. 8 is a plan view of a conductive grid electrode in the touch panel provided by at least one embodiment of the present disclosure.

FIG. 8 is a schematic plan view of the conductive grid electrode 113.

Figure 9:
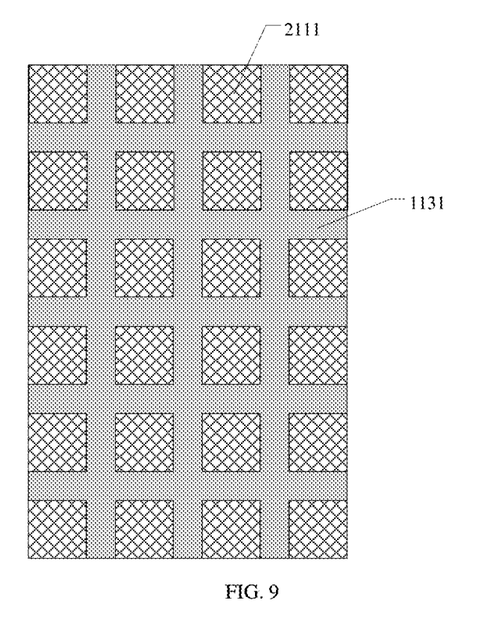
FIG. 9 is a plan view of the conductive grid electrode and the second electrode in the touch panel provided by at least one embodiment of the present disclosure.

FIG. 9 shows a schematic plan view illustrating the conductive grid electrode 113 and the plurality of second sub-electrodes 2111 insulated from one another. The grid line 1131 of the conductive grid electrode 113 is located in the gap between adjacent second sub-electrodes 2111; and in the plan view, the gap between adjacent second sub-electrode 2111 is fully filled by the grid line 1131 of the conductive grid electrode 113.

For example, as shown in FIG. 9, the orthographic projection of the conductive grid electrode 113 on the first base substrate 101 does not coincide with the orthographic projections of the plurality of second sub-electrodes 2111 on the first base substrate 101.

Figure 10:
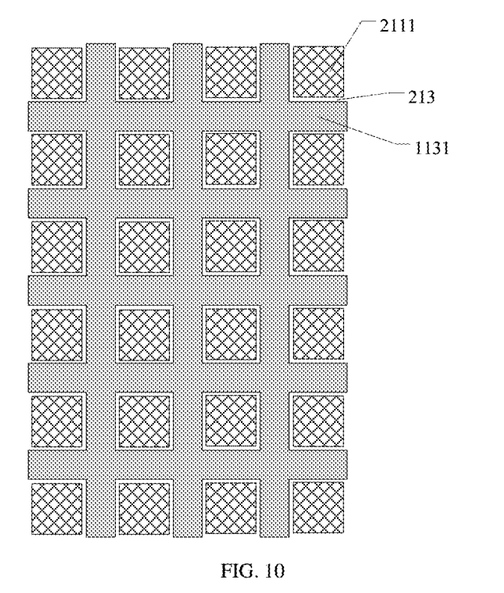
FIG. 10 is a plan view of the conductive grid electrode and the second electrode in the touch panel provided by the embodiment of the present disclosure.

FIG. 10 shows a schematic plan view illustrating the conductive grid electrode 113 and the plurality of second sub-electrodes 2111 insulated from one another. In FIG. 10, the grid line 1131 of the conductive grid electrode 113 is located in the gap between adjacent second sub-electrodes 2111. For example, a gap 213 is between the second sub-electrode 2111 and the grid line 1131 of the conductive grid electrode 113.

According to the touch panel provided by the embodiments of the present disclosure, the shape of the first electrode 111 includes the planar shape or the grid shape, and a shape of the piezoelectric layer 112 includes the planar shape or the grid shape.

At least one embodiment of the present disclosure provides a touch device, comprising any one of the above-described touch panels. For example, the touch device comprises a touch display device. For example, the touch display device includes, but is not limited to, a liquid crystal display device, an organic light emitting diode display device, and so on.

At least one embodiment of the present disclosure provides a driving method of the touch panel provided by any one of the above-described embodiments. The driving method comprises: inputting a reference signal to the first electrode 111, the reference signal including, for example, a reference voltage; inputting a touch drive signal to the second electrode 211 (the plurality of second sub-electrodes 2111), the second electrode coupling the first charges at the pressed position (the second sub-electrode 2111 at the pressed position coupling the first charges) and outputting the touch signal; and detecting the touch signal to recognize the touch position and the touch pressure. In this case, the plurality of second sub-electrodes 2111 are self-capacitive electrodes, and the touch signal includes combination information of the touch position and the touch pressure, so that the touch position is recognized while recognizing the touch pressure. In a case where the plurality of second sub-electrodes 2111 are not self-capacitive electrodes, for example, only a touch pressure signal is output and only the touch pressure is recognized. Of course, in the embodiments of the present disclosure, the plurality of second sub-electrodes 2111 are not the self-capacitive electrodes, for example, the detection of the touch position and the touch pressure are implemented in a mutual capacitance mode.

In the driving method of the touch panel provided by at least one embodiment of the present disclosure, the touch position and the touch pressure are simultaneously obtained according to the output signal of the second electrode 211 (the plurality of second sub-electrodes 2111).

For example, the touch drive signal is an alternating current signal, for example, an alternating current voltage signal, but it is not limited thereto.

According to the driving method provided by at least one embodiment of the present disclosure, the detecting the touch signal to recognize the touch position and the touch pressure includes: decomposing a touch position signal and a touch superposed signal from the touch signal, to obtain the touch position from the touch position signal and obtain the touch pressure (a magnitude of the pressure) from the touch superposed signal.

According to the driving method provided by at least one embodiment of the present disclosure, in the case where the second electrode is further used as the common electrode for display, the touch and the display for example are performed in a time-division manner, and the driving method comprises: inputting a display signal to the second electrode 211 in a first time period; and inputting the touch drive signal to the second electrode 211 in a second time period.

For example, the first time period is a display time period, and the second time period is a touch time period. In the display time period, in addition to inputting the display signal to the second electrode 211, other operation for display are performed cooperatively, for example, inputting a data signal to a pixel electrode.

For example, the plurality of second sub-electrodes 2111 output the touch signal; the second sub-electrode 2111 at the untouched position outputs the touch reference signal S1, and the second sub-electrode 2111 at the touch position outputs the touch position signal S2; since the touch position signal S2 is different from the touch reference signal S1, the touch position is recognized. In a case of touch with pressure, that is, the panel is pressed, the second electrode (the second sub-electrode 2111) at the touch position outputs the touch signal Sp including the touch position signal S2 and the touch superposed signal S3. The touch superposed signal S3 increase a change trend of the touch position signal S2, that is, if S2 is smaller than S1, a sum of the touch position signal S2 and the touch superposed signal S3 is more smaller than the touch reference signal S1, and if S2 is larger than S1, the sum of the touch position signal S2 and the touch superposed signal S3 is more larger than the touch reference signal S1. The touch superposed signal S3 is the touch pressure signal. The touch pressure signal is generated by the second electrode (the second sub-electrode 2111) coupling the first charges. The touch press varies with the amount of first charges being coupled. The amount of the first charges is determined by the magnitude of the touch pressure, so the touch pressure information is obtained through analysis of the touch pressure signal.

For example, by detecting whether the touch signal is superposed with the touch pressure signal or not and a situation of the touch pressure signal (that is, whether or not the output signal of the second electrode 211/the second sub-electrode 2111 includes the touch superposed signal S3), the touch pressure information is obtained. For example, the touch position information is also obtained according to the touch signal.

For example, the first electrode 111 is fabricated by using a coating method or magnetron sputtering method. The first electrode 111 may be fabricated by using a suitable method according to a material selected.

For example, the piezoelectric layer 112 is fabricated by using the coating method. For example, the piezoelectric layer 112 is fabricated by using a spin-coating method, or is fabricated by using other suitable method. The piezoelectric layer 112 may be fabricated by using a suitable method according to a material selected.

It should be noted that, for the sake of clarity, in the drawings used for describing the embodiments of the present disclosure, thicknesses of layers or regions are enlarged or reduced. It may be understood that, when an element such as a layer, a film, a region or a substrate is referred to as being located "on" or "below" another element, the element may be "immediately" located "on" or "below" another element, or there may be an intermediate element.

Besides, without conflict, features in a same embodiment and different embodiments of the present disclosure may be combined with each other.

The above merely are specific embodiments of the present disclosure, but the scope of the embodiment of the present disclosure is not limited thereto. Any variation or replacement which can be easily thought of by those skilled in the art in the scope of the present disclosure all shall fall within the scope of protection of the present disclosure. Therefore, the scope of the present disclosure should be the scope of the following claims.

The invention claimed is:

1. A touch panel, comprising:
    a first base substrate;
    a second base substrate opposite to the first base substrate;
    a first electrode on a side of the first base substrate facing away from the second base substrate, and configured to provide a reference;
    a piezoelectric layer between the first electrode and the first base substrate; and
    a second electrode between the first base substrate and the second base substrate;
    wherein, the piezoelectric layer is configured to generate first charges on a side thereof close to the second electrode upon being pressed, and the second electrode is configured to couple the first charges at a pressed position and output a touch signal;
    the touch panel further comprises a conductive grid electrode, and the conductive grid electrode is between the first electrode and the piezoelectric layer; and
    the second electrode includes a plurality of second sub-electrodes insulated from one another, and an orthogonal projection of the conductive grid electrode on the first base substrate does not coincide with orthogonal projections of the plurality of second sub-electrodes on the first base substrate.

2. The touch panel according to claim 1, wherein, a material of the first electrode is a high-resistance material with a square resistance greater than 1M Ω/□.

3. The touch panel according to claim 1, wherein, the first electrode is connected with a reference voltage terminal.

4. The touch panel according to claim 1, wherein, the first electrode is further configured to output at least one of static electricity and second charges, and the second charges are charges generated by the piezoelectric layer upon being pressed and having a polarity opposite to the first charges.

5. The touch panel according to claim 1, wherein, the piezoelectric layer is in contact with the first electrode.

6. The touch panel according to claim 1, wherein, an orthogonal projection of a grid line of the conductive grid electrode on the first base substrate is between the orthogonal projections of adjacent second sub-electrodes on the first base substrate.

7. The touch panel according to claim 6, wherein, the orthogonal projection of the grid line of the conductive grid electrode on the first base substrate fully fills a gap between the orthogonal projections of adjacent second sub-electrodes on the first base substrate.

8. The touch panel according to claim 6, wherein, a gap is between the orthogonal projection of the grid line of the conductive grid electrode on the first base substrate and the orthogonal projections of the second sub-electrodes on the first base substrate.

9. The touch panel according to claim 1, wherein, the second electrode is on a side of the first base substrate facing away from the piezoelectric layer.

10. The touch panel according to claim 1, wherein, the second electrode is on a side of the second base substrate close to the first base substrate.

11. The touch panel according to claim 1, wherein, the second electrode is further used as a display electrode.

12. The touch panel according to claim 1, wherein, a shape of the first electrode includes a planar shape or a grid shape, and a shape of the piezoelectric layer includes a planar shape or a grid shape.

13. The touch panel according to claim 1, further comprising a detector unit, wherein, the detector unit is configured to detect the touch signal so as to obtain a touch pressure.

14. A driving method of the touch panel according to claim 1, comprising:
inputting a reference signal to the first electrode;
inputting a touch drive signal to the second electrode, the piezoelectric layer generating the first charges on the side thereof close to the second electrode upon being pressed, the second electrode coupling the first charges at the pressed position and outputting the touch signal; and
detecting the touch signal to recognize a touch position and a touch pressure.

15. The driving method of the touch panel according to claim 14, wherein, the detecting the touch signal to recognize the touch position and the touch pressure includes:
decomposing a touch position signal and a touch superposed signal from the touch signal, to obtain the touch position from the touch position signal and obtain the touch pressure from the touch superposed signal.

16. The driving method of the touch panel according to claim 14, wherein, touch and display are performed in a time-division manner, and the driving method comprising:
inputting a display signal to the second electrode in a first time period;
inputting the touch drive signal to the second electrode in a second time period.

17. A touch device, comprising the touch panel according to claim 1.

* * * * *